Figure 1:
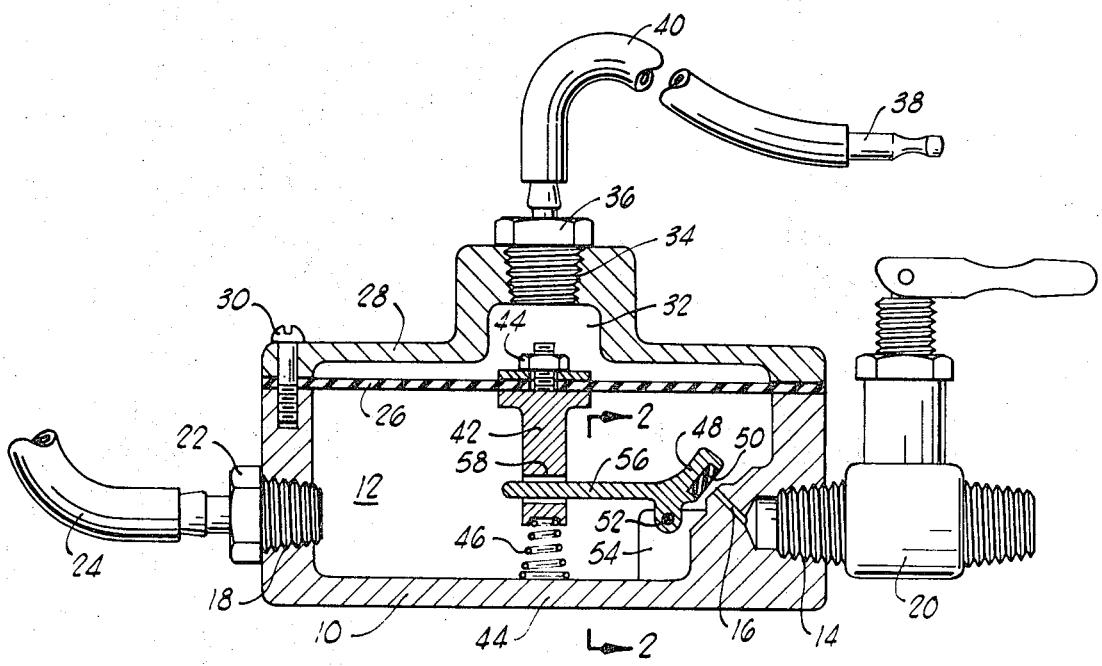
Figure 3:
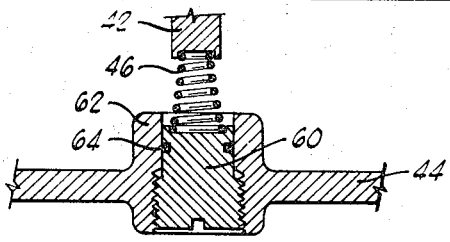
Figure 4:
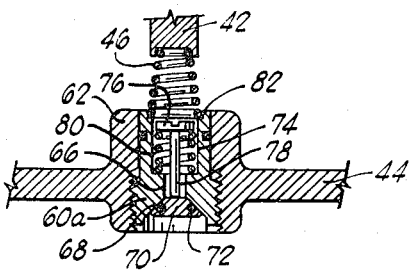
Figure 2:
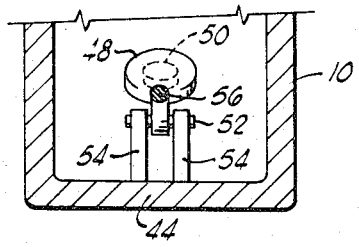

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 23, 1971

884 O.G. 1323

T883,025
CONTROLLER FOR GLASSBLOWING

George J. Hanggi, 1605 Trio Lane, and Harry L. Mussett, 427 Drake, both of Ponca City, Okla. 74601

Filed Apr. 6, 1970, Ser. No. 25,803
Int. Cl. F16k *31/165*
U.S. Cl. 137—495
1 Sheet Drawing. 12 Pages Specification

Apparatus for controlling the gas supplied for glassblowing, wherein the glassblower is isolated from the glass apparatus being worked upon, particularly useful when working upon a glass apparatus containing a toxic product. The apparatus includes a valve chamber connected to a pressurized gas supply and the apparatus being worked upon, and a valve member pivotally supported in the valve chamber for controlling the flow of gas to the apparatus being worked upon. A flexible diaphragm forms one wall of the valve chamber and the glassblower's mouth piece is placed in communication with the side of the diaphragm opposite to the valve chamber for flexing the diaphragm when the glassblower blows or sucks on the mouth piece. A lever system providing a mechanical advantage connects the diaphragm to the valve member. An adjustable spring is disclosed for urging the valve member closed. A relief valve for the valve chamber is also disclosed.

Feb. 23, 1971 G. J. HANGGI ET AL T883,025

CONTROLLER FOR GLASSBLOWING

Filed April 6, 1970

INVENTORS
GEORGE J. HANGGI &
HARRY L. MUSSETT
BY
William C. Nikesell Jr.
ATTORNEY